United States Patent Office

3,367,888
TREATMENT OF COMBUSTIBLE WASTE PRODUCTS AND CATALYST THEREFOR

James Hoekstra, Evergreen Park, Ill., assignor to Universal Oil Products Company, Des Plaines, Ill., a corporation of Delaware
No Drawing. Filed Aug. 19, 1963, Ser. No. 303,133
8 Claims. (Cl. 252—466)

The present invention relates to the treatment of combustible waste products, prior to discharging the same into the atmosphere, and involves the preparation of an improved catalytic composite having a novel physical structure and composition and the use of such catalytic composite.

More specifically, the invention described herein is directed toward the use of a catalyst having the activating component added in the presence of a sulfur-containing acid to provide particular characteristics enhancing its activity and low temperature stability when effecting the conversion of auto exhaust gases from low emission engines or other gaseous, combustible waste products of a noxious nature, into innocuous components for the primary purpose of eliminating the adverse effects exhibited by such waste products upon the atmosphere.

While the catalytic composite encompassed by the present invention is especially adaptable to the elimination of the products of incomplete combustion from the hydrocarbonaceous exhaust gases emanating from an internal combustion engine, prior to effecting the discharge of such hydrocarbonaceous exhaust gases into the atmosphere, there are also other obnoxious products which may well be treated. For example, unsaturated hydrocarbons, alcohols, ketones, aldehydes, acids, etc., as well as carbon monoxide and oxides of nitrogen and sulfur, etc., comprise objectionable materials.

Prior associated work has discovered the improved oxidation and/or conversion of waste gases through the use of an impregnating agent to assist in positioning the active component layer a finite distance below the surface of the carrier material. It has now been discovered that such catalytic composites are best utilized for treating exhaust gases under the more severe conditions, as from high emission engines where temperature conditions in a converter-muffler are substantially higher than from low emission engines. It further appears that the use of certain sulphur containing impregnating agents will assist in maintaining the active component on the extreme outer surface of the carrier particles and that a resulting catalyst has desirable low ignition temperature characteristics and high activity and stability, as long as extremely high temperature conditions are not encountered. New auto engines tend to release relatively low quantities of unburned hydrocarbons and carbon monoxide as compared with engines of older vehicles and, as a result, are generally designated as having low emission rates.

It is a primary object of the present invention to provide a method and improved catalyst for effecting the catalytic treatment of noxious, combustible gaseous waste products for the purpose of eliminating the noxious material and/or converting the same into innocuous components.

A related and particular object is to produce a catalytic composite having a novel physical structure and the propensity for capably effecting the oxidation of hydrocarbons and carbon monoxide, as encountered in the exhaust streams from low emission engines.

A still further object of the invention is to provide a sulfur-containing impregnating agent along with the platinum compound or other metal activating component to effect the physical deposition of the active component on the outer surface of the carrier material where it is useful to provide a highly active catalyst composite.

A broad embodiment of the present invention encompasses a catalytic particle comprising an inorganic oxide carrier material and a catalytically active metallic component attached as an outer surface to said carrier material without any substantial penetration thereof.

Another broad embodiment of the present invention involves a method of preparing an oxidizing catalytic composite which comprises impregnating an inorganic oxide carrier material with an active catalytic component in the presence of a sulfur-containing organic acid and effecting the deposition of such active component on the outer surface of the carrier material.

In another embodiment of the present invention, there is provided a method for preparing a catalyst composite for the oxidation of waste gases which comprises commingling low density alumina particles with a platinum compound providing from about 0.01% to about 0.5% and with from about 0.13% to about 0.70% by weight, based upon the weight of said alumina, of a sulfurized carboxylic acid and effecting the deposition of the platinum on the outer surface of said alumina particles without any substantial penetration thereof.

One of the preferred sulfur-containing organic acid compounds comprises thiomalic acid, and thus in still another embodiment of the invention there is provided a method for effecting the conversion of an exhaust gas stream in a manner which comprises contacting said gas stream in the presence of air and at oxidizing conditions with a catalytic composite of alumina and platinum, with said composite being prepared by commingling low density alumina with a solution of a platinum containing compound and thiomalic acid in an amount of from about 0.13% to about 0.70% by weight, based upon the weight of said alumina, whereby to effect the deposition of the platinum only on the outer surface of said alumina particles and without any substantial penetration thereof.

As hereinbefore indicated, the method of the present invention involves the catalytic treatment of noxious, gaseous combustible waste products prior to discharging the same into the atmosphere and more particularly involves catalytic treatment of gases from low emission engines. The catalytic composite for use therein, hereinafter described in detail, may be placed in any suitable container, or catalytic converter, and installed within the exhaust line in such a manner that the gaseous waste products are passed therethrough. The catalytic converter may be of the throughflow, cross flow or radial flow design, and, when utilized in the conversion of the noxious components emanating from an internal combustion engine, may either supplant, or be combined with the common acoustic muffler. Combustion air is injected ahead of the converter inlet, usually by an aspirator or suitable external compressive means, and the waste products, together with air, are passed through the catalyst in either upward or downward flow, crossflow or radial flow. When employed in other applications, such as the treatment of the gaseous waste products from the printing, tanning and petrochemical industries, the catalytic composite may be conveniently disposed as a fixed bed within the stack, or other outlet ducts, of a suitable combustion chamber, the combustion products and air being passed in admixture into contact with the catalyst prior to being discharged into the atmosphere. The precise physical structure of the catalytic converter, the means for introducing combustion air, and the disposition of the catalytic composite within the converter are dependent to a large extent upon the application and the function to be served.

A wide variety of factors affect the stability of active catalytic composites, and are generally peculiar to the environment in which the catalyst is employed. For example, an automotive internal combustion engine is commonly operated over a wide range of speed and load conditions including idling, cruising, accelerating and decelerating and, therefore, the combustion efficiency of such an engine is varied considerably. The space velocity and temperature of the manifold exhaust gases, as well as the concentration of combustible material therein, will similarly vary over relatively wide limits. Therefore, when applied to the treatment of the noxious exhaust gases from an automotive internal combustion engine, the catalyst must necessarily have the inherent capability of performing over a wide range of conditions and should possess high activity at substantially lower temperatures. The catalyst should also have a relatively low threshold activation temperature in order that the necessary conversion reactions become self-initiating within a minimum period of time following the startup of the engine at relatively cold conditions.

As employed in the present specification, as well as in the appended claims, the term "metallic component" is intended to connote those components of the catalyst which are employed for their catalytic activity in converting the noxious material into innocuous components, as distinguished from that portion of the catalyst herein referred to as the refractory inorganic oxide, and which is employed for the purpose of supplying a suitable carrier material, or support, for the "catalytically active metallic components." Although not considered to be a limiting feature of the present invention, it is preferred that the catalytically active metallic component, or components, be composited with a refractory inorganic oxide carrier material which has an apparent bulk density less than about 0.4 gram per cc. Preferred refractory inorganic oxides, for use as the carrier material, possess an apparent bulk density within the range of about 0.15 to about 0.35 gram per cc. The catalytically active metallic components, composited with the refractory inorganic oxide carrier material, may be one or more of the following: vanadium, chromium, molybdenum, tungsten, members of the iron-group and platinum-group of the Periodic Table, copper, silver and gold. A particular metal may be used in and of itself, or in combination with any of the foregoing metals. The catalyst of the present invention may comprise a metallic component selected from Groups V-A, VI-A and VIII of the Periodic Table. Thus, the catalyst to be employed in the treatment of noxious, gaseous combustible waste products, prior to discharging the same into the atmosphere, may comprise the following: platinum, palladium, other noble metals such as iridium, ruthenium, and rhodium, iron, cobalt, nickel, copper, vanadium, tungsten, molybdenum, silver, gold and various mixtures including platinum-iron, platinum-cobalt, platinum-nickel, palladium-iron, palladium-cobalt, palladium-nickel, platinum-palladium, palladium-copper-cobalt, copper-cobalt-nickel-platinum, platinum - palladium - cobalt, etc. It is understood that the catalytic activity, stability, auto-initiating temperature and other characteristics of the catalyst of the present invention may vary from catalyst to catalyst. Many of the specific catalytic composites discussed herein do not necessarily yield equivalent results when compared with a catalyst comprising one or more different metallic components, or when utilized under varying conditions in different applications. Although the precise manner in which the catalytically active metallic component, such as platinum, is associated with the carrier material, is not known with absolute certainty, it is believed that the platinum, or other metallic component, enters into a combination with the carrier material. Therefore, it is understood that the use of the term "platinum" or "metallic component," for example, connotes platinum or other metallic components existing within the carrier material in a combined form and/or in the elemental state.

The catalytic composite of the present invention, the method of the preparation of which is hereinafter set forth in greater detail, utilizes a refractory inorganic oxide as the carrier material for the active metallic components hereinbefore set forth. Refractory inorganic oxides possess particular physical characteristics which readily permit adaptation thereof to the rather unique environment encountered in the operation of a motor vehicle, as well as in other commercial applications. One desired physical characteristic, for example, is that high temperatures do not apparently affect the capability of the material to function as desired. The refractory inorganic oxide carrier material, for utilization in the catalyst of the present invention, may be manufactured by any suitable method including separate, successive, coprecipitation means of manufacture when comprising two or more individual inorganic oxides. The carrier material may comprise naturally-occurring substances such as clays or earths, and may not be activated prior to use by one or more treatments including drying, calcining, steaming or treatments with various reagents, etc. The catalytic composite of the present invention will preferably make use of an alumina-containing refractory inorganic oxide carrier material: as employed herein, the term "alumina" is intended to include porous aluminum oxide in various states of hydration. In addition to alumina, other refractory inorganic oxides may be employed, either in conjunction with, or instead of, the alumina. Other suitable inorganic oxides include silica, boria, thoria, titania, zirconia, hafnia and mixtures of two or more. The incorporation of any of the foregoing refractory inorganic oxides, in conjunction with alumina, is generally dependent upon the desire to add thereto certain physical and/or chemical characteristics required by the particular application for which the catalytic composite is intended. Such other refractory inorganic oxides, for example, silica, will be present within the carrier material in an amount within the range of about 0.5% to about 25.0% by weight thereof, based upon the final weight of the carrier. Intermediate quantities are preferred and will lie within the range of 1.0% to about 10.0% by weight. The carrier material may take the form of any desired shape such as spheres, pills, extrudates, granules, cakes, briquettes, rings, etc. The preferred form is the sphere, and spheres may be continuously manufactured by the well-known oil drop method: this method is described in detail in U.S. Patent No. 2,620,314 issued to James Hoekstra. In the interest of simplicity and clarity, the following discussion will generally refer to the use of alumina as the refractory inorganic oxide carrier material.

Where desired, halogen may be combined with the alumina and the catalytically active metallic components, and may be added thereto in any suitable manner either before, or after the incorporation of the active metallic components. The addition of the halogen is generally accomplished through the use of an acid such as hydrogen fluoride and/or hydrogen chloride, or volatile salt such as ammonium fluoride and/or ammonium chloride, and the halogen may be combined with the alumina during the preparation of the latter. In still another method of manufacture, the halogen may be composited with a refractory oxide during the impregnation thereof with the catalytically active metallic components. Thus, where the alumina is prepared from an alumina hydrosol having an aluminum to chloride weight ratio of about 1:3, the use of such method permits the incorporation of chloride where the latter is desired as the halogen component.

Regardless of the particular refractory inorganic oxide carrier material employed, and in accordance with the present invention, during or prior to the addition of the metallic component, such as platinum, the preformed inorganic oxide particles, such as alumina, are treated with a sulfur-containing organic acid. The selected sulfurized acid may be added to the alumina particles as a separate solution just prior to commingling with the metallic component; however, for ease in handling and metering, the organic acid is preferably admixed, in the requisite quantity, with the water, soluble compound of the intended catalytically active metallic component, and the resulting impregnating solution combined with the carrier material. With respect to platinum, suitable water-soluble compounds for utilization in the impregnating solution include chloroplatinic acid, chloroplatinous acid, platinous chloride, platinic chloride, etc. Where the catalytc composite is intended to contain other metallic components, such as those hereinbefore set forth, the composite may be prepared by commingling water-soluble compounds of these components, particularly the nitrates, sulfates, chlorates, chlorides, or carbonates, and immersing the particles of the carrier material therein, followed by heating to form the corresponding oxides of the metallic components.

The sulfur-containing organic acid utilized in the method of the present invention is preferably a thio or mercapto carboxylic acid, as for example, thiomalic acid, thioglycolic acid, mercaptopropionic acid, etc.

The quantity of the organic acid, or derivative thereof, to be employed in admixture with the water-soluble compound of the catalytically active metallic component and the carrier material, is generally based upon the weight of such carrier material. The amount of organic acid employed is within the range of about 0.1% to 1.5% by weight. An intermediate concentration of the organic acid and/or its derivative is preferred, and is within the range of from about 0.13% to about 0.70% by weight, based upon the weight of the carrier material.

The quantity of the catalytically active metallic components is based upon the volume of the carrier material to be combined therewith and is calculated on the basis of the elemental metal, notwithstanding that the metallic component may exist in some combined complex form, or in the elemental state. Thus, with respect to platinum-group metals, the platinum will be present in an amount of from about 0.05 to about 2.0 Troy ounces per cubic foot of carrier material. The preferred range of the concentration of the platinum component, dictated by economic considerations, is from about 0.15 to about 0.60 Troy ounce per cubic foot of carrier material. The other metallic components, either in conjunction with, or instead of the platinum component, will be present in an amount of from about 0.01 to about 2.0 Troy ounces per cubic foot of carrier material employed.

As indicated hereinbefore, the organic sulfurized acid may be admixed with the water soluble compound of the catalytically active metallic component, or components, or mixed with the alumina prior to the addition of the metallic component thereto. In any case, it is an essential feature of the present invention that the metallic component be not combined with the alumina prior to the addition of the sulfur containing organic acid. Basic impregnation in preparing the improved catalyst is avoided, in that the commingling of the refractory inorganic oxide, the catalytically active metallic component and the organic acid is accomplished in the absence of substances and reagents of a highly alkalinous nature, particularly including ammonia and other nitrogenous compounds, alkali metal compounds, etc. It has further been found that the catalytic composite is adversely affected when contacted with a nitrogen-containing gas during the final high temperature stages of the manufacture thereof.

In describing the method of manufacturing the catalytic composite encompassed by the present invention, it is understood that the same is not considered to be unduly limited to the particular catalytic composite described. The catalyst, in one example, is prepared by initially forming alumina spheres, 1/16-inch to about 3/16-inch in diameter, from an aluminum chloride hydrosol having an aluminum chloride weight ratio of about 1.25. The alumina spheres are continuously prepared by passing droplets of the hydrosol into an oil bath maintained at an elevated temperature, retaining the droplets within the oil until the same set into hydrogel spheroids. The spheroids are dried at a temperature of from about 200° F. to about 800° F., and thereafter subjected to a calcining treatment at a temperature of from about 800° F. to about 1200° F. An impregnating solution of chloroplatinic acid, having the concentration of 0.0628 gram of platinum per milliliter, is prepared by diluting 3.0 milliliters to about 500 milliliters with water. When utilized with the approximately 150 grams of the alumina spheres, having an apparent bulk density of about 0.29 gram per cc., this concentration of the chloroplatinic acid solution will yield a final composite having about 0.32 Troy ounce of platinum per cubic foot of the spherical alumina carrier material. The chloroplatinic acid solution is then commingled with about 0.42 gram of thiomalic acid, or about 0.28% by weight based upon the weight of the spheres. The resulting mixture of thiomalic acid, chloroplatinic acid and alumina spheres is evaporated to dryness in a rotating drier at a temperature of about 210° F. When the spheres appear visually dry, usually in about two to about eight hours, the impregnated spheres are subjected to a reducing treatment, preferably in an atmosphere of hydrogen, while increasing the temperature to a level within the range of about 200° F. to about 1000° F., maintaining the elevated temperature for about two hours. Contrary to present-day methods of manufacturing catalytic composites, the catalyst of the present invention is not subjected to an oxidation treatment at elevated temperature, or to high temperature calcination in an atmosphere of air. A high temperature oxidation treatment tends to destroy both the initial activity and, more particularly, the stability of the catalytic composite to effect the removal and/or conversion of the noxious components in the combustible gaseous waste products.

From the foregoing description, it will be noted that the inorganic oxide carrier material and additive component is combined with a catalytically active metallic component, with the latter being composited in all instances, in the presence of a particular quantity of a sulfurized organic acid.

Prior associated test work has also shown that certain alkaline earth components, such as barium, calcium and strontium, and particularly barium, when used as additive components to a catalyst composite will assist in giving resistance and stability to high temperature conditions. Thus, to increase high temperature resistance an alkaline earth component may be added to the carrier before or after impregnation thereof with the active metallic component in the presence of the sulfurized organic acid.

Various methods of impregnation may be used to impregnate the carrier material with the added alkaline earth components. Generally, a water-soluble compound of the particular component is used to soak the carrier or the activated composite so as to insure a bond of the component, as a resulting oxide with the carrier. Thus, the barium, strontium or calcium compound may be in the form of a hydroxide, a formate, a nitrate, etc., when used to impregnate the carrier or composite. Impregnation may be adequately accomplished in a one or two hour soaking, however, generally the soaking will be carried out for four to twenty hours or the like to provide optimum results. After the impregnation, the composite is subjected to drying by heating or the use of a rotary evaporator. It appears also that impregnation with the added component may be before or after impregnation with the active metallic catalytic component, although equivalent activities, stabilities, crushing strengths and lead resistances may not be obtained from the different methods of compositing. It further appears that the added component shall be present in an amount greater than 1% by weight of the resulting composite, so as to improve such composite for effecting the oxidation and conversion of noxious waste gases.

The following examples are given for the purpose of illustrating clearly the method of manufacturing and using the catalytic composite encompassed by the present invention. It is understood that the present invention is not to be unduly limited beyond the scope and spirit of the appended claims, by the conditions, reagents, concentrations or catalytic composites employed within the examples. The data presented within the examples will indicate the benefits to be afforded through the utilization of the present invention, which invention produces a catalytic composite giving highly effective conversion to exhaust gases from low emission engines.

The following examples describe experimental composites which were employed in obtaining data to evaluate the improved catalyst and methods of preparation, as well as use in effecting conversion of hydrocarbons and carbon monoxide in an engine exhaust gas stream. A specific catalyst evaluation test procedure was utilized that was designed to determine the catalytic stability with respect to automotive exhaust conversion. The various catalytic composites are evaluated by a test procedure which simulates actual driving conditions. The test procedure involves the utilization of a standard dynamometer, by which an eight-cylinder internal combustion engine is loaded by a motor-generator. Approximately 440 cc. of each of the catalyst portions are individually evaluated by each being placed within a cylindrical vessel or converter, having an inside diameter of about 4 inches, the entire apparatus being serially connected into the engine exhaust line. In each case, the catalyst sample is disposed within the converter on a supporting screen to a bed height of about 2 to 3 inches. A second screen is placed above the catalyst bed for the purpose of separating the catalyst from the ¼-inch ceramic balls employed to facilitate the even distribution of the exhaust gases flowing downwardly through the apparatus. Four such catalyst loaded converters are utilized in a given test period; this practice permits the simultaneous testing of different catalysts, and provides an excellent basis for making a comparative study of the results.

Combustion air is pressured into the converter inlets, the flow rate being adjusted to 43 pounds per hour to provide an excess of oxygen over that required to burn all of the carbon monoxide and unburned hydrocarbons. The inlet temperature to the converter is maintained at 800° F. The fuel employed in the test procedure is a blend of catalytically reformed gasoline (40.0%), catalytically cracked gasoline (40.0%) and alkylate (20.0%), and contains 3.0 milliliters of tetraethyl lead per gallon. Since the concentration of unburned hydrocarbons, and other noxious products, within the exhaust gases, as well as the throughput thereof, varies in accordance with the physical status of the engine, whether idling, accelerating, cruising or decelerating, the test procedure still further approximates actual road conditions by providing for a constant load throughout only a portion of the entire test period. Samples of the converter inlet and outlet gases are taken at various intervals during the test procedure, there bing a constant analysis for the concentration of carbon monoxide. The samples are analyzed for hydrocarbons by a flame-ionization detector. The term "hydrocarbon," as utilized in reporting the results of the analyses performed on the effluent gases from the catalytic converter, connotes all hydrocarbons whether saturated, unsaturated or partially oxidized as hereinbefore set forth. The carbon monoxide concentration within the exhaust gases is determined by an accurate infrared detector. The internal combustion engine is operated in a particular cycle to simulate idling, accelerating, cruising and decelerating as experienced under actual road conditions. During the entire test procedure, which covers a period of at least about 32 hours to 40 hours, about 300 gallons of the aforementioned fuel is employed. The test period is divided into six cycles; each cycle consists of a two hour cruise period at a constant 2100 r.p.m. and 41 BHP, and a three hour cycle period consisting of a series of two-minute cycles comprising idling at 750 r.p.m., accelerating to cruise at 2000 r.p.m., and a deceleration to idling at 750 r.p.m.

An inherent result of the small volume of catalyst employed in the test evaluation procedure is that the space velocity of the exhaust gases coming into contact with the catalyst is considerably higher than would usually be encountered under actual driving conditions. Accordingly, the percentage conversion obtained during actual use in automotive exhaust gas converters would be considerably higher.

Example I

In order to provide a reference catalyst for comparison purposes, ⅛" alumina spheres were impregnated with a sufficient quantity of chloroplatinic acid (having a concentration of 0.0628 gram of platinum per milliliter) to yield a catalyst containing 0.32 Troy ounce of platinum, calculated as the element thereof, per cubic foot of alumina. After impregnation the spheres were evaporated to dryness in a rotating dryer at a temperature of about 200° F. Subsequently, while gradually increasing the temperature level to the order of about 1000° F. the catalyst was subjected to an atmosphere of hydrogen for about a two-hour period. The catalyst was allowed to cool prior to being exposed to the atmosphere.

Upon testing, the catalyst was found to provide an initial hydrocarbon conversion of 69% and at the end of 32 hours a conversion of 44%. The carbon monoxide conversion was initially 94% and after 32 hours a conversion of 69%.

Example II

The catalyst in this instance was prepared in a similar manner as that set forth in the previous examples except that during the impregnation with the chloroplatinic acid there was the addition of citric acid in a 3 to 1 molar ratio of citric acid to chloroplatinic acid. The resulting composite after reduction had a platinum content which was substantially the same as set forth in the previous examples, with 0.32 Troy ounce of platinum per cubic foot of alumina.

Upon testing, the catalyst was found to provide an initial hydrocarbon conversion of 53% and after 32 hours a conversion of 41%. The carbon monoxide conversion was initially 83% and after 32 hours 71%.

Example III

The platinum-alumina catalyst composite of this example was prepared in a procedure similar to that set forth in the prior example except that in this instance the platinum impregnation was carried out in the presence of thiomalic acid, with the latter being present in a three to one molar ratio with respect to the chloroplatinic acid. Reduction in the presence of hydrogen was carried out in a conventional manner.

Upon testing, the catalyst was found to provide an initial hydrocarbon conversion of 59% and after a 32 hour period the conversion was 55.5%.

The initial carbon monoxide conversion was 84.5% while after 32 hours the conversion was 81.5%.

Example IV

The catalyst composite in this instance was prepared in the same manner as that set forth in Example III utilizing a three to one molar ratio of thiomalic acid as compared to the chloroplatinic acid.

In the test operation for this catalyst, the initial hydrocarbon conversion was 73% and after 32 hours the conversion was 63%. The initial carbon monoxide conversion was found to be 95% and after 32 hours was 85%.

Example V

The platinum-alumina catalyst composite of this example was impregnated with the same amounts of chloroplatinic acid and thiomalic acid as in Examples III and IV, however, in this instance the alumina base was first impregnated with a solution containing the thiomalic acid and dried after which it was impregnated with the chloroplatinic acid. Reduction in the presence of hydrogen was carried out in a conventional manner.

Upon testing the catalyst was found to provide an initial hydrocarbon conversion of 72% and after a 32 hour period the conversion was 65%. The initial carbon monoxide conversion was 93.5% while after 32 hours the conversion was 85.5%.

Example VI

The catalyst in this instance was initially prepared in the same manner as that set forth in Examples III and IV; however, following the platinum impregnation in the presence of thiomalic acid and a subsequent reduction the composite was subjected to an overnight soaking in the presence of a 10% barium oxide solution. Following the soaking operation the catalyst was subjected to rinsing and drying providing a resulting platinum-alumina-barium oxide composite.

Upon testing, the catalyst was found to provide an initial hydrocarbon conversion of 66% and after 32 hours a conversion of 45%. The initial carbon monoxide conversion was 98% and after 32 hours 68%.

Example VII

The catalyst in this example was prepared in a manner similar to that set forth in connection with Example VI, except, however, the platinum impregnation was carried out in the presence of thioglycolic acid, with the latter being present in a three to one ratio to the chloroplatinic acid. A subsequent impregnation was provided with a 10% solution of barium oxide to provide a resulting platinum-alumina-barium oxide composite.

Upon testing, the catalyst was found to provide an initial hydrocarbon conversion of 73% and at the end of 32 hours a conversion of 40%. The carbon monoxide conversion was initially 100% and after 32 hours 62%.

Example VIII

The catalyst in this instance was prepared in a manner similar to that set forth in Examples VI and VII, except that the platinum impregnation was carried out in the presence of mercaptopropionic acid with the latter being present in a three to one molar ratio with the chloroplatinic acid. Again, the platinum-alumina composite was subjected to soaking and impregnation in the presence of a 10% barium oxide solution to provide a resulting platinum-alumina-barium oxide composite.

Upon testing, the catalyst was found to provide an initial hydrocarbon conversion of 77% and after 32 hours a conversion of 38%. The initial carbon monoxide conversion was 100% and after 32 hours a conversion of 55%.

For convenience in comparing the data from the various tets procedures, the results are recapitulated in the following Table I:

TABLE I

| Example No. | Type of Catalyst | Hydrocarbon Conversion | | Carbon Monoxide Conversion | |
|---|---|---|---|---|---|
| | | A | 32 hr. | A | 32 hr. |
| I | $Al_2O_3$ plus .32 Tr. Oz. Pt plus red. | 69.0 | 44.0 | 94.0 | 69.0 |
| II | $Al_2O_3$ plus .32 Tr. Oz. Pt plus 3/1 CA plus red. | 53.0 | 41.0 | 83.0 | 71.0 |
| III | $Al_2O_3$ plus .32 Tr. Oz. Pt plus 3/1 TMA plus red. | 59.0 | 55.5 | 84.5 | 81.5 |
| IV | $Al_2O_3$ plus .32 Tr. Oz. Pt plus 3/1 TMA plus red. | 73.0 | 63.0 | 95.0 | 85.0 |
| V | $Al_2O_3$ plus TMA (3/1) dried plus .32 Tr. Oz. Pt plus red. | 72.0 | 65.0 | 93.5 | 85.5 |
| VI | $Al_2O_3$ plus .32 Tr. Oz. Pt plus 3/1 TMA plus red plus 10% BaO. | 66.0 | 45.0 | 98.0 | 68.0 |
| VII | $Al_2O_3$ plus .32 Tr. Oz. Pt plus 3/1 Thioglycolic Acid plus 10% BaO. | 73.0 | 40.0 | 100.0 | 62.0 |
| VIII | $Al_2O_3$ plus .32 Tr. Oz. Pt plus mercaptopropionic plus 10% BaO. | 77.0 | 38.0 | 100.0 | 55.0 |

A comparison of the results of the catalysts which had the platinum impregnation carried out in the presence of a sulfurized organic acid indicates that such catalysts had a relatively high conversion and good stability at the end of the test period. The catalyst without the special impregnation, although having, in some instances, relatively high initial conversion, showed a rather rapid loss in activity or stability as indicated by the present conversion at the end of the test period. A specific difference may also be noted upon comparing the tests of a citric acid impregnated catalyst of Example II with the thiomalic impregnated catalysts of Examples III and IV, where the latter have high initial activity and good stability, the stability being indicated by a relatively high activity at the end of the 32 hour test period.

Although all of the catalysts prepared in the presence of a sulfurized organic acid exhibit improved test results by virtue of either a higher initial conversion activity or improved stability, there appears to be some advantage to the use of the thiomalic acid in providing a higher stability over the prolonged test period for both hydrocarbon and carbon monoxide conversions.

I claim as my invention:

1. A method of catalyst preparation which comprises commingling a refractory inorganic oxide carrier with a Group VIII metal component in an amount of from about 0.01 to about 2.0 Troy ounces of said component per cubic foot of carrier and with from about 0.1% to about 1.5% by weight of a sulfur-containing carboxylic acid selected from the group consisting of thiomalic, thioglycolic and mercaptopropionic acid and effecting the deposition of said metal component on the outer surface of the carrier without any substantial penetration thereof, and subsequently reducing the composite in an atmosphere of hydrogen at a temperature within the range of from about 200° F. to about 1000° F.

2. The method of claim 1 further characterized in that said acid is thiomalic acid.

3. The method of claim 1 further characterized in that said metal component comprises platinum.

4. A method for preparing a catalyst composite which comprises commingling low density alumina particles with from about 0.01% to about 0.5% by weight of platinum group metal and with from about 0.1% to about 1.5% by weight of a sulfur-containing carboxylic acid selected from the group consisting of thiomalic, thioglycolic and mercaptopropionic acids and effecting the deposition of such platinum group metal on the outer surface of said alumina particles without any substantial penetration thereof and subsequently reducing the composite in an atmosphere of hydrogen at a temperature within the range of from about 200° F. to about 1000° F.

5. A method for preparing a catalyst composite which comprises commingling low density alumina particles with a platinum compound providing from about 0.01% to about 0.5% of platinum and with from about 0.13% to about 0.70% by weight, based upon the weight of said alumina, of a sulfur-containing carboxylic acid selected from the group consisting of thiomalic, thioglycolic and mercaptopropionic acids and effecting the deposition of the platinum on the outer surface of said alumina particles without any substantial penetration thereof, and subsequently reducing the composite in an atmosphere of hydrogen at a temperature within the range of from about 200° F. to about 1000° F.

6. The method of claim 5 further characterized in that said sulfur containing acid comprises thiomalic acid.

7. The method of claim 5 further characterized in that said sulfur-containing acid comprises thioglycolic acid.

8. The method of claim 5 further characterized in that said sulfur-containing acid comprises mercaptopropionic acid.

(References on following page)

References Cited

UNITED STATES PATENTS

| | | | |
|---|---|---|---|
| 3,065,595 | 11/1962 | Gary | 23—2 X |
| 3,133,029 | 5/1964 | Hoekstra | 23—2 X |
| 3,173,856 | 3/1965 | Burton et al. | 252—466 X |
| 2,840,532 | 6/1958 | Haensel | 252—466 |
| 2,927,088 | 1/1960 | Michalko et al. | 252—466 |
| 2,982,741 | 5/1961 | Cleaver | 252—466 |
| 3,220,797 | 11/1965 | Lester | 252—466 |
| 3,259,589 | 7/1966 | Michalko | 252—466 |

DANIEL E. WYMAN, *Primary Examiner.*

EARL C. THOMAS, *Examiner.*

L. G. XIARHOS, P. E. KONOPKA, *Assistant Examiners.*